United States Patent
Klang et al.

(10) Patent No.: US 6,330,271 B1
(45) Date of Patent: Dec. 11, 2001

(54) CDMA RECEIVER THAT SHARES A TRACKING DEVICE AMONG MULTIPLE RAKE BRANCHES

(75) Inventors: Göran Klang, Solna; Per Konradsson, Sundbyberg, both of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/169,943

(22) Filed: Oct. 13, 1998

(51) Int. Cl.[7] .............................. H04B 15/00; H04K 1/00; H04L 27/30
(52) U.S. Cl. ........................ 375/134; 375/130; 375/147
(58) Field of Search ............................. 375/134, 147, 375/140, 347, 130; 370/335, 342, 441; 455/10, 504, 526

(56) References Cited

U.S. PATENT DOCUMENTS

| | | | |
|---|---|---|---|
| 5,101,501 | 3/1992 | Gilhousen et al. | 455/33 |
| 5,109,390 | 4/1992 | Gilhousen et al. | 375/1 |
| 5,166,952 | 11/1992 | Omurg et al. | 375/1 |
| 5,343,496 | 8/1994 | Honig et al. | 375/1 |
| 5,467,368 | 11/1995 | Takeuchi et al. | 375/206 |
| 5,485,486 | 1/1996 | Gilhousen et al. | 375/205 |
| 5,486,834 | 1/1996 | Lennen | 342/357 |
| 5,488,631 | 1/1996 | Gold et al. | 375/206 |
| 5,495,499 | 2/1996 | Fenton et al. | 375/215 |
| 5,499,272 | 3/1996 | Bottomley | 375/347 |
| 5,528,624 | 6/1996 | Kaku et al. | 375/206 |
| 5,574,754 | 11/1996 | Kurihara et al. | 375/367 |
| 5,579,338 | 11/1996 | Kojima | 375/208 |
| 5,648,983 | 7/1997 | Kostic et al. | 375/206 |
| 5,652,748 | 7/1997 | Jolma et al. | 370/320 |
| 5,654,979 | 8/1997 | Levin et al. | 375/206 |
| 5,764,687 | 6/1998 | Easton | 375/206 |
| 5,945,948 * | 8/1999 | Buford et al. | 342/457 |
| 6,064,338 * | 5/2000 | Kobayakawa et al. | 342/378 |
| 6,128,333 * | 10/2000 | Kinoshita et al. | 375/147 |
| 6,157,687 * | 12/2000 | Ono | 375/347 |
| 6,157,820 * | 12/2000 | Sourour et al. | 455/226.2 |

FOREIGN PATENT DOCUMENTS

| | | |
|---|---|---|
| 198 41 148 | 4/1999 | (DE). |
| 0661829 | 7/1995 | (EP). |

* cited by examiner

Primary Examiner—Mohammad H. Ghayour
(74) Attorney, Agent, or Firm—Burns, Doane, Swecker & Mathis, L.L.P.

(57) ABSTRACT

A CDMA receiver includes a plurality of RAKE branches for despreading the received CDMA signals over a corresponding plurality of paths and a single tracking device that is shared among the plurality of the RAKE branches for tracking the delays of the received CDMA signal over a corresponding path. Similarly, a method for tracking a CDMA signal correlates the received signal with local PN codes using a plurality of RAKE branches and tracks the received signal using a single tracking device that is shared among the plurality of the RAKE branches.

17 Claims, 2 Drawing Sheets

CDMA RECEIVER THAT SHARES A TRACKING DEVICE AMONG MULTIPLE RAKE BRANCHES

FIELD OF THE INVENTION

The present invention relates to a method and apparatus for estimating multi-path radio signal transmission delays, and more particularly to a method and apparatus for tracking multi-path signal delays in telecommunications systems that use direct sequence spread spectrum techniques.

BACKGROUND OF THE INVENTION

The field of wireless communications is expanding at a phenomenal rate, as more radio spectrum becomes available for commercial use and as cellular phones become commonplace. In addition, there is currently an evolution from analog communications to digital communications. In digital communications, speech is represented by a series of bits which are modulated and transmitted from transmitter (e.g.,a base station) to a receiver (e.g.,a mobile phone). The receiver demodulates the received waveform to recover the bits, which are then converted back into speech. There is also a growing demand for data services, such as e-mail and Internet access, which require digital communications.

There are many types of digital communications systems. Traditionally, frequency division-multiple-access (FDMA) is used to divide the spectrum up into a plurality of radio channels corresponding to different carrier frequencies. These carriers may be further divided into time slots, a technique referred to as time-division-multiple-access (TDMA), as is done in the D-AMPS, PDC, and GSM digital cellular systems.

If the radio channel is wide enough, multiple users can use the same channel using spread spectrum (SS) techniques and code-division-multiple-access (CDMA). IS-95 and JSTD-008 are examples of CDMA standards. With direct sequence spread spectrum (DS-SS), information symbols are represented by sequences of symbols referred to as chips. This spreads the information symbols in the frequency band. At the receiver, correlations to the chip sequences are used to recover the information symbols. Spreading allows the system to operate at a low chip signal-to-noise ratio (SNR). By choosing spreading codes with good auto-and cross-correlation properties cross talk between different users can be kept at a low level allowing multiple user signals to occupy the same bandwidth at the same time.

The radio signal is reflected and scattered off of various objects, giving rise to multi-path propagation. As a result, multiple images of the signal arrive at the receive antenna. When these images have roughly the same delay, relative to the chip period, they give rise to fading. Fading occurs because the images add sometimes constructively, and sometimes destructively. When these images arrive with different delays relative to the chip period, they can be viewed as echoes of the signal and are often referred to as "resolvable multi-paths," "rays," or simply "multi-paths."

To communicate efficiently and reliably, the receiver should exploit the multi-path fading channel by collecting signal energy from the different multi-paths. This is achieved by employing a RAKE receiver, which individually detects each echo signal using a correlation method, corrects for different time delays, and combines the detected echo signals coherently. The RAKE receiver includes a number of processing RAKE branches or "fingers." Using a delay searcher, the receiver searches for delays of the multi-paths and assigns an estimated delay to each one of the RAKE branches. Each RAKE branch then despreads the signal received over a path with a corresponding delay. The RAKE branch outputs are RAKE combined by weighting them and adding them together.

For mobile communications, the movement of mobile stations changes multi-path delays over time. To maintain performance, the delay estimation procedure must be able to track the multi-path delays. In conventional tracking RAKE receivers, RAKE branches are equipped with corresponding tracking devices, which employs delay tracking techniques, such as the early/late gate (ELG) and tau-dither techniques. With these delay tracking techniques, the signal energy is measured slightly before and slightly after the estimated delay. When the estimated delay is correct, then the early and late measurements should be approximately equal, as the chip pulse waveform falls off symmetrically about its peak. When an imbalance is detected, the delay estimate is adjusted to restore balance.

In a DS-CDMA based system, the ELG technique is implemented using two independent correlation receivers, an early correlation receiver and a late correlation receiver. Each correlation receiver works with a spreading code, also known as pseudo-noise (PN) code, that is shifted plus and minus a fraction k of the chip period $T_C$ relative to the estimated delay used by the RAKE branch. In order to adjust for path delay changes, the estimated received power from the early and late correlation receivers are compared, usually low-pass filtered, and used to control the phase of a local PN code generator.

As explained above, in conventional CDMA receivers, each RAKE branch has a dedicated tracking device. Because of the signal processing requirement, the implementation of a dedicated tracking device for each RAKE branch significantly complicates the hardware design of the CDMA receiver. For example, implementation of dedicated ELGs, each having two correlation receivers, for each one of the RAKE branches, requires twice as many ELG correlation receivers as data demodulating correlator receivers. In addition to complex hardware requirement, the implementation of dedicated tracking devices also increases the CDMA receiver's power consumption. Therefore, there exists a need to reduce hardware complexity and power consumption of the CDMA receivers that utilize tracking RAKE receivers.

SUMMARY OF THE INVENTION

The present invention reduces the hardware complexity of a CDMA receiver by sharing a tracking device among a number of RAKE branches. The CDMA receiver of the present invention includes a plurality of RAKE branches for despreading the received CDMA signals over a corresponding plurality of multi-paths. According to the present invention, a single tracking device is shared among the plurality of the RAKE branches. The single tracking device tracks the delays of the received CDMA signal over a corresponding path. A method for tracking a CDMA signal according to the present invention correlates the received signals over the multi-paths with corresponding local PN codes using a plurality of RAKE branches and tracks the received signal using a single tracking device that is shared among the plurality of the RAKE branches.

DETAILED DESCRIPTION OF THE INVENTION

Figure 1:
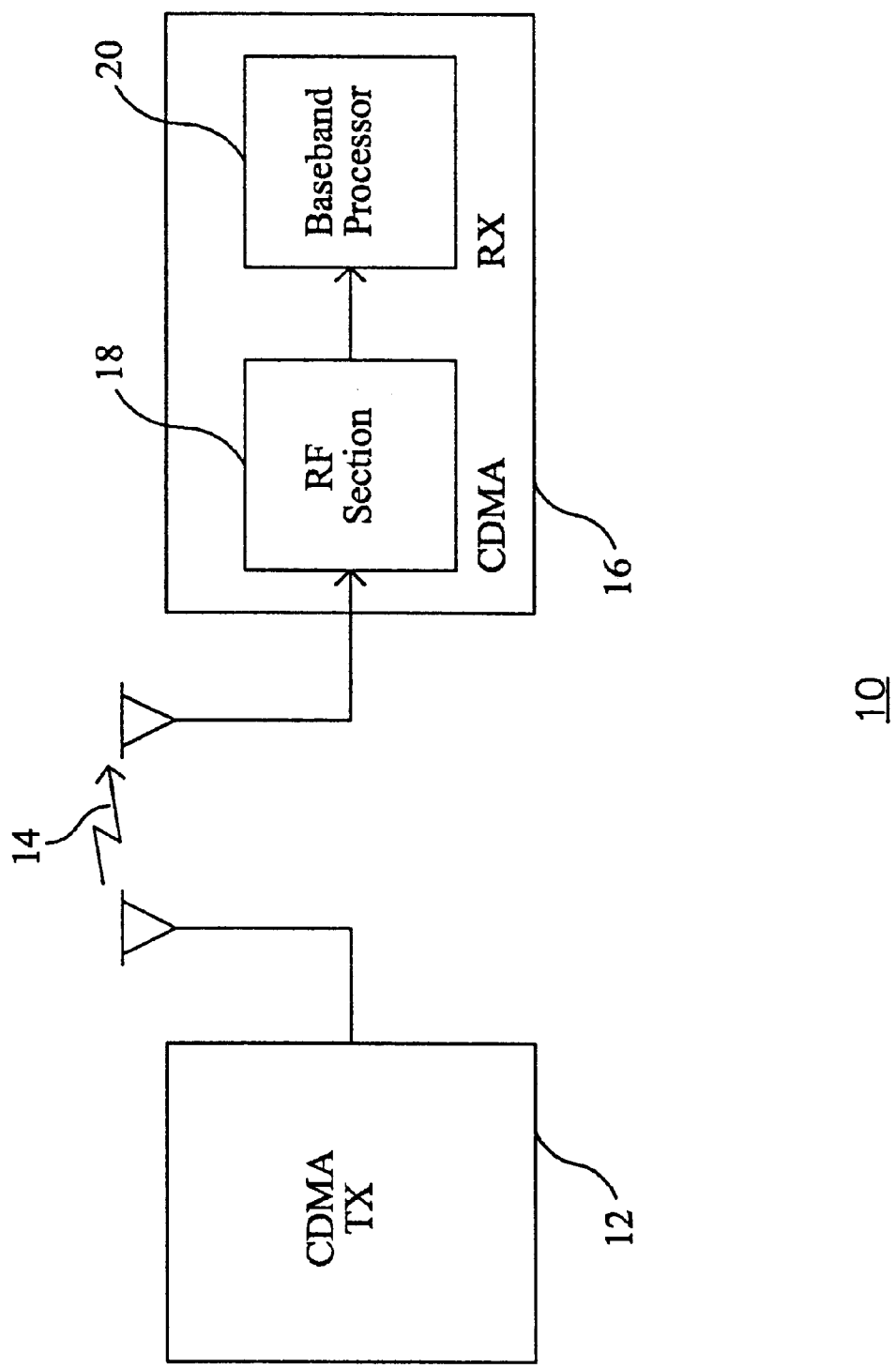
FIG. 1 is a block diagram of a communication system that incorporates the present invention.

Referring to FIG. 1, a block diagram of a communication system 10 employing the present invention is illustrated. The communication system 10, which in the exemplary embodiment of the invention is a DS-SS communication system, includes a DS-SS transmitter 12 that transmits a DS-SS signal 14 through a multi-path fading channel having an assumed number of (M) paths. A receiver 16 having an RF section 18 and a baseband processor 20 receives the DS-SS signal 14 along the M paths. In a well known manner, the RF section 18 amplifies, filters, and mixes the DS-SS signal 14 down to a baseband frequency, typically centered around 0 Hz. The down-converted signal is also sampled and quantized, producing data samples that are representative of the modulated signal. For example, the signal may be sampled using a sampling period of $T_{samp}$ that provides a predefined number of samples during each chip period $T_c$ corresponding to the required synchronization accuracy of the receiver. For the exemplary system 10, it is assumed that the sampling rate is equal to n samples per chip.

Figure 2:
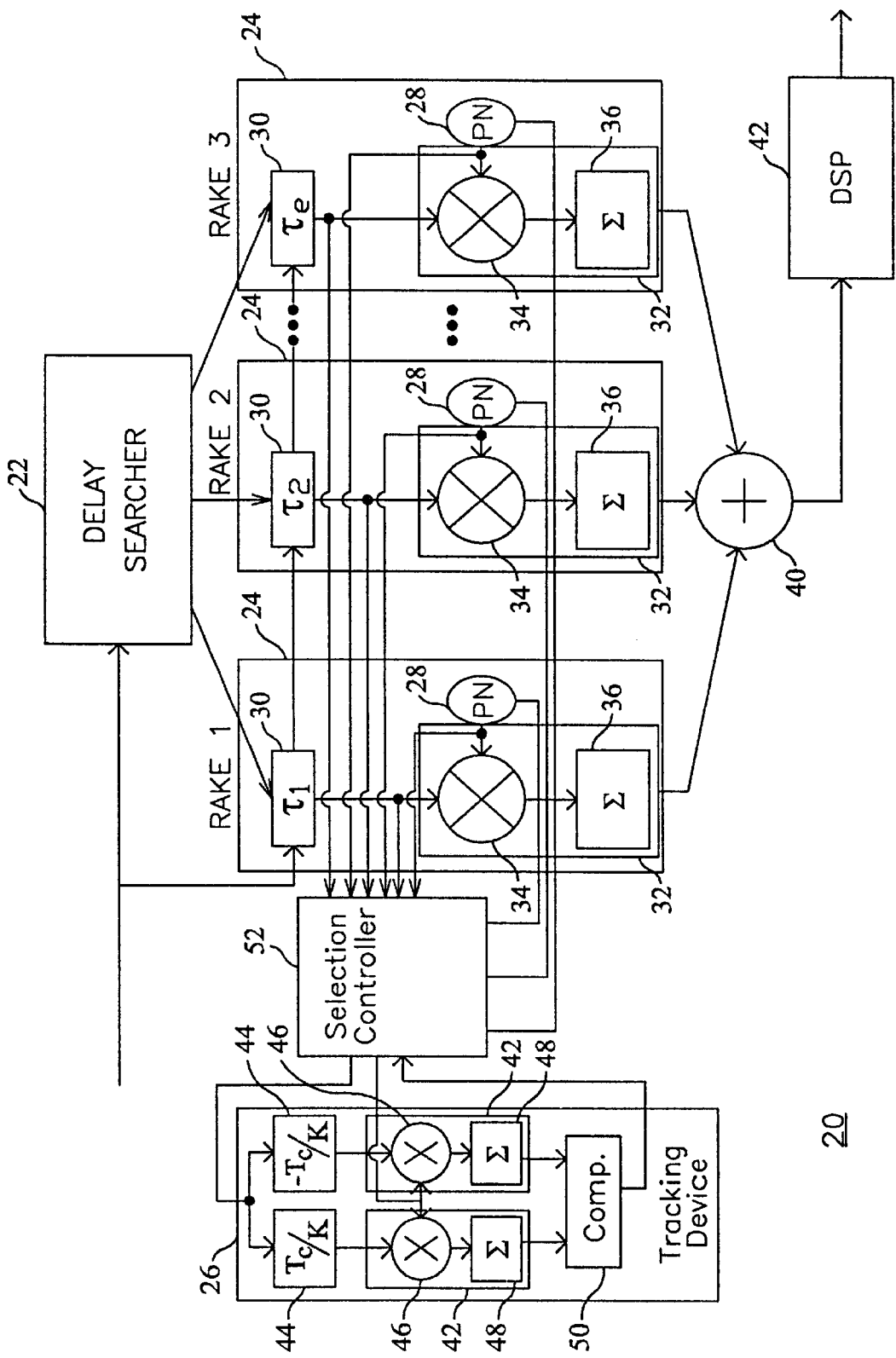
FIG. 2 is a block diagram of a baseband processor according to the present invention.

Referring to FIG. 2, the block diagram of the baseband processor 20 according to the present invention is shown. The baseband processor 20 includes a delay searcher 22, a plurality (L) of RAKE branches 24, and a single tracking device 26. It should be noted that there is no requirement for the number of RAKE branches to be the same as the number of paths (M). If L >M, L minus M branches are switched off. Meanwhile if L <M, the strongest paths are assigned for demodulation and the remaining M minus L paths are ignored. In the exemplary embodiment of the present invention, the tracking device 26 is assumed to be a conventional time-shared non-coherent dual correlator early-late gate (ELG) tracking device. It should be noted, however, that the present invention may utilize other types of tracking devices, such as time-shared single correlator ELG (Tau dither ELG) or a double dither ELG.

In the exemplary embodiment of the invention, each RAKE branch 24 includes a local PN code generator 28 and a delay element 30 that based on assigned time delay information from the searcher correct for relative propagation delay differences between the paths to be demodulated. Each branch 24 also includes a correlation receiver 32, which includes a multiplier 34 and an accumulator 36. The PN code generator 28 of each branch 24 applies a local PN code to the corresponding multiplier 34 of each one of the correlation receivers 32. Each one of the multipliers 34 multiply the local PN codes with the stream of chips representing the data samples as provided by a corresponding delay element 30. The accumulator 36 of each one of the correlation receivers 32 recover the user information from each of the DS-SS signal received over the corresponding plurality of paths by performing a correlation that produces a corresponding correlation result $R_C$. The correlation results the corresponding plurality of paths by performing a correlation that produces a correspo correlation result $R_C$. The correlation results $R_C$ are sent to a Digital Signal Processor 42 for further processing.

More specifically, the delay searcher 22 makes initial, coarse estimates of the multi-path delays and provides the delay elements 30 with these initial estimated delay $\tau_{l,est}$. Under the assumption that the DS-SS signal is received among the multi-paths with exact delays $\tau_1, \tau_2, \ldots, \tau_L$, the delay searcher 22 assigns delay element 30 number l the initial estimated delay, $\tau_{l,est}$, corresponding to channel path number l, where l=1, 2, ... or L. Correlation receiver 32 number 1 then performs correlations based on the assigned delay information until it is either reassigned a new delay value or switched off.

Each RAKE branch must continuously track or be synchronized with one of the channel paths. This means that the misalignment between the local despreading code used in this branch and the transmitted spreading code of one of the channel paths must be close to zero. Thus, each RAKE branch must be provided with the delays of the multi-paths. The ELG tracking device 26 refines the multi-path delay estimates provide by the delay searcher 22, and continues to track these delays and provide accurate delay estimates to the RAKE branches 24.

The ELG tracking device 26 relies on the fact that the correlation function resulting from the correlation of a transmitted spreading code and a locally generated PN code is symmetrical. The ELG tracking device 26 includes two independent correlation receivers 47 that make two correlations between the local PN code and the received DS-SS signal along each path. Similar to the correlation receiver, 32, of the RAKE branches, each correlation receiver in the ELG tracking device includes a delay element 44, a multiplier 46 and a summer 48. For tracking the paths, the delay elements of the ELG tracking device use an early-late delay δ equal to the absolute value of Tc/k, where k is an integer selected based on the sampling rate of the receiver, i.e., $Tc/T_{samp}$, preferably in the range of 2–16. One ELG correlation receiver, an early correlation receiver, uses a delay $\delta_1 = -T_c/k$, while the other, a late correlation receiver, uses a delay $\delta_2 = T_c/k$. The results of the early and late correlations, $R_{\delta 1}$ and $R_{\delta 2}$, are compared, to adjust the phase of the local PN code or the estimated delay $\tau_{l,est}$ to converge on the exact channel path delay $\tau_{exact}$.

Unlike conventional CDMA receivers, which use dedicated ELGs tracking devices for each one of the RAKE branches 24, the present invention uses the single ELG tracking device 26 by sharing it among the plurality of the RAKE branches 24. Compared to the conventional CDMA receivers that require 2*L correlation receivers for tracking (or 3*L correlation receivers in total in the ELG's and in the RAKE branches), the CDMA receiver of the present invention only requires 2 correlation receiver for tracking (or L+2 correlation receivers in total in the ELG's and in the RAKE branches). The present invention takes advantage of the fact that the time-of-arrival (TOA) of signals at each one of the selected paths at the CDMA receiver changes very slowly. For example, using the early-late delay of δ=Tc/k in a mobile station traveling with a speed equal to v, the TOA would change once every Cδ/v second, where C is the speed of light. Under the IS95 communication standard, where k is equal to 8, a CDMA receiver using a chip rate of 1.2288 Mcps, a CDMA receiver traveling with a speed of 90 km/h causes a TOA change of δ to occur once every 60-th frame. Therefore, by selectively scheduling the connection of the ELG tracking device to each one of the RAKE branches 24 at an appropriate rate, the CDMA receiver of the invention can effectively keep track the path propagation delays without the need for a dedicated tracking device for each RAKE branch 24.

Depending on channel conditions, selection rate or connection schedule of the shared ELG tracking device 26 to the RAKE branches 24 may be static, semi-static, or dynamic. For example, in environments where the channel conditions change slowly compared to a specified time interval measure, such as frame duration, slot duration (partial frame duration) or symbol duration, the ELG tracking device 26 may be scheduled for connection to each RAKE branch 24 at a constant selection rate by continuously sweeping through the RAKE branches based on one of the aforementioned parameters. However, if there is a considerable change in channel conditions from time to time, the shared ELG tracking device 26 may be coupled to the RAKE branches 24 at a semi-static selection rate through continuous or non-continuous sweeping of the RAKE branches 24 based on known or measured channel statistics.

If, however, the channel characteristics are not known, a dynamic selection and assignment approach may be utilized to select and assign the shared ELG tracking device 26 to the RAKE branches. For example, the selection rate and assignment schedule of the shared ELG tracking device 26 to the RAKE branches 24 may be adaptively determined based on a received power level. It should be noted that depending on a required accuracy and adaptation rate of the dynamic scheme, the method of measuring the received power level may differ. When quick adaptation to changes in the transmission environment is required, a received power level measurement based on one or a few symbols may be used. On the other hand, when more accuracy is required, the received power level measurement may instead be based on an average power measurement obtained during a number of symbol periods i.e., as an average value of a number of received symbol power level measurement values. Under another arrangement of on-demand based tracking method, the shared ELG tracking device 26 may be assigned to the RAKE branches 24 if a detected received signal power level at a corresponding RAKE branch is lower than either a fix or an adaptive threshold value.

A tracking device selection controller 50 selectively couples the ELG tracking device 32 to each one of the RAKE branches 24. Operationally, the selection controller 50 sequentially connects the ELG device to the RAKE branches 24 one by one at a predefined or adaptively set selection rate. More specifically, for each RAKE branch 24, the selection controller 50 connects a corresponding local PN code and a corresponding synchronized signal to the inputs of the ELG for a period defined by the selection rate. During each selection period, a corresponding local PN code is connected to the ELG delay elements 44 and the signal is connected to the input of the ELG multiplier 46. In this way, the ELG summers 48 produce the correlation results for a selected branch. A comparator 52 compares the correlation results and provides a comparison result to the selection controller 50. The selection controller 50 provides the comparison result to the corresponding PN code generator of the selected RAKE branch, to adjust the phase of the local PN code. Alternatively, the delay value of $\tau_{est}$ may be adjusted based on the comparison result. A process of iterative comparison of the correlation results continues until the correlation results from the early correlation receiver and late correlation receiver become equal. The information retrieved from the early-late correlation receivers combined with demodulation information from the demodulating receiver, e.g., power information, are used for tracking each path.

From the foregoing description it would be appreciated that the present invention significantly simplifies the hardware requirements of the CDMA receiver. The reduction in hardware complexity of the CDMA receiver also reduces its power consumption, without sacrificing performance. The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. For example, other types of tracking devices may be used, including those based on tau-dither, double dither or extended Kalman Filter techniques. Accordingly, it is expressly intended that all such variations, changes and equivalents which fall within the spirit and scope of the present invention as defined in the claims be embraced thereby.

What is claimed is:

1. A CDMA receiver for receiving a CDMA signal over a multi-channel, comprising:
    a plurality of RAKE branches for despreading the received CDMA signals over a corresponding plurality of paths; and
    a tracking device that is selectively coupled to each one of the plurality of RAKE branches for tracking the delays of the received CDMA signal over a corresponding path.

2. The CDMA receiver of claim 1, wherein the tracking device is selectively coupled to the plurality of RAKE branches at a constant rate.

3. The CDMA receiver of claim 1, wherein the tracking device is selectively coupled the plurality of RAKE branches at a dynamic rate that is dependent on channel conditions.

4. The CDMA receiver of claim 3, wherein the dynamic rate is determined based on a measurement of a received power level and a predefined threshold.

5. The CDMA receiver of claim 4, wherein the received power level is measured over one or more symbols.

6. The CDMA receiver of claim 4, wherein the received power level is based on an average value from several symbols.

7. The CDMA receiver of claim 2, wherein the constant rate is based on one of a symbol, slots or frame duration.

8. The CDMA receiver of claim 1, wherein the tracking device is selectivley coupled the plurality of RAKE branches at a semi static rate that is dependent on changed channel statistics.

9. The CDMA receiver of claim 1, wherein the tracking device is an early/late gate (ELG) tracking device.

10. The CDMA receiver of claim 1, wherein the tracking is a tau-dither tracking device.

11. A method for tracking a CDMA signal including the steps of:
    despreading a received signal with local PN codes using a plurality of RAKE branches; and
    tracking the received signal using a single tracking device that is selectively coupled to each one of the plurality of RAKE branches.

12. The method of claim 11, wherein the tracking device is selectively coupled to one of the plurality of RAKE branches at a selection rate that is dependent upon channel conditions.

13. The method of claim 12, wherein the selection rate is dynamic.

14. The method of claim 12, wherein the selection rate is semi-static.

15. The method of claim 12, wherein the selection rate is static.

16. The method of claim 11, wherein the tracking device is an early/late gate (ELG) tracking device.

17. The method of claim 11, wherein the tracking device is a tau-dither tracking device.

* * * * *